Patented May 11, 1948

2,441,223

UNITED STATES PATENT OFFICE 2,441,223

ACCELERATOR OF VULCANIZATION

Marion W. Harman, Nitro, W. Va., assignor to Monsanto Chemical Company, St. Louis, Mo., a corporation of Delaware No Drawing. Application December 6, 1944, Serial No. 566,950

16 Claims. (Cl. 260—790)

1

The present invention relates to new and improved accelerators for the vulcanization of a rubber, to a process of vulcanizing a rubber or a rubber containing material and to the vulcanized rubber products obtained with the aid of the new accelerators.

The accelerators of the present invention comprise reaction products of organic mercaptans with formaldehyde and ammonia. While mercaptans have been combined with formaldehyde and ammonia before, the accelerators of this invention contain these reactants in a different ratio than in the products heretofore produced. Thus, the ammonium salt of mercaptobenzothiazole is known to react with formaldehyde, presumably producing a compound of the structure

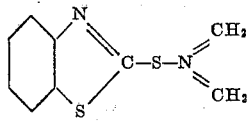

Similarly tris(mercapto methyl) amines, i. e. compounds of the general structure

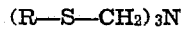

where R is an organic radical, are produced by the combination of mercaptans with formaldehyde and ammonia. Some of these prior known products are accelerators but they are relatively unstable substances and are not suitable for factory use because they bring about premature vulcanization during processing. The accelerators of the present invention are stable substances, usually solids of high melting point. They can be handled in the factory without danger of prevulcanization and in fact possess considerable delayed action.

The new accelerators are condensation products produced by elimination of water from a mercapto thiazole, formaldehyde and ammonia which reaction products contain more than one molecular proportion of formaldehyde but less than one molecular proportion of ammonia combined with each molecular proportion of the mercapto thiazole.

Typical examples of mercapto thiazoles, derivatives of which are within the scope of the present invention, comprise 2-mercapto 4-methyl thiazole
2-mercapto naphtho thiazole
2-mercapto 6-nitro benzothiazole
2-mercapto 5-chlor benzothiazole
2-mercapto 4-methyl benzothiazole
2-mercapto 4-phenyl benzothiazole
2-mercapto 4-ethyl thiazole
2-mercaptobenzothiazole
2-mercapto dihydrothiazole (2-mercapto thiazoline)

2

The reactions are best effected in aqueous medium since organic solvents seem to favor the formation of by-products which do not contain the high proportion of formaldehyde constituent characteristic of the new accelerators. The following example illustrates the preparation of one of the new accelerators but is not limitative of the invention.

EXAMPLE

Into a container of suitable capacity fitted with an efficient stirrer and reflux condenser there was charged 206 parts by weight (substantially 1.2 molecular proportions) of finely powdered mercaptobenzothiazole, 164 parts by weight (substantially 2 molecular proportions) of 37% formaldehyde and 1000 parts by weight of water. The mixture was stirred until a thin slurry was formed, then about 1 part by weight of soda ash added or enough to render the charge slightly alkaline, followed by 28 parts by weight (substantially 0.46 molecular proportion) of ammonium hydroxide sp. g. 0.90 diluted with 100 parts by weight of water. The addition of the ammonia brought about a slight exothermic reaction. The mass was stirred and slowly heated up to 90° C. over a period of about three hours. Heating and stirring were then continued at 90–95° for 5 to 20 hours and the mass filtered hot. Excellent yields were obtained over this entire range of heating periods and only slight improvements were noticeable upon heating longer than five hours. The pale yellow fine crystalline product was washed with water and dried at 70° C. The crude product softened at about 210° and melted with decomposition at 223–226° C. It was slightly soluble or insoluble in all common solvents except chlorobenzene and o-dichlor benzene from which it could be recrystallized. After two recrystallizations the purified product melted at 233–235° C. Analysis of the pure product gave the following:

|  | Found | Calculated for $C_{27}H_{22}O_2N_4S_6$ |
| --- | --- | --- |
| Carbon | 51.57 | 51.53 |
| Hydrogen | 3.24 | 3.53 |
| Nitrogen | 8.87 | 8.94 |
| Sulfur | 30.64 | 30.69 |
| Oxygen (by diff.) | 5.68 | 5.31 |

The product is therefore believed to be formed in accordance with the following equation:

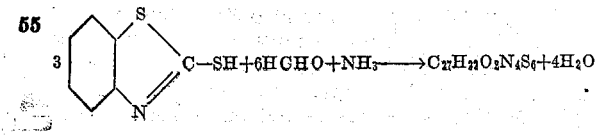

However, a possible alternative equation is:

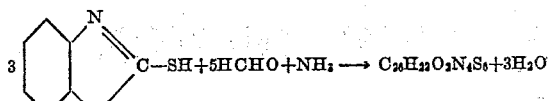

The structure suggested by the alternate equation is as follows:

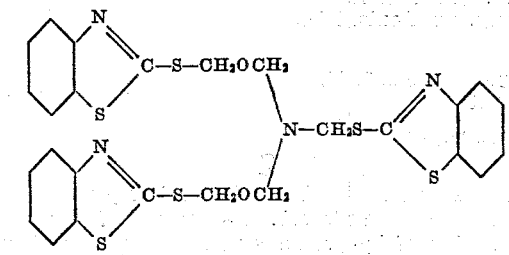

This product will be hereinafter designated as accelerator A.

As a typical example of the invention which is illustrative of the invention but not limitative thereof rubber stocks were compounded comprising

|  | Stock | |
|---|---|---|
|  | A | B |
|  | Parts by weight | Parts by weight |
| Pale crepe rubber | 100 | 100 |
| Zinc oxide | 5 | 5 |
| Sulfur | 3 | 3 |
| Stearic acid | 0.5 | 0.5 |
| Mercaptobenzothiazole | 0.75 |  |
| Accelerator A |  | 0.75 |

The stocks so compounded were vulcanized in the usual manner by heating in a press for different times at the temperature of 20 pounds steam pressure per square inch. The modulus and tensile properties of the cured rubber products are set forth below:

TABLE I

| Stock | Cure Time in Mins. | Modulus of Elasticity in lbs./in.² at elongations of— | | Tensile at Break in lbs./in.² | Ultimate Elongation, Per Cent |
|---|---|---|---|---|---|
|  |  | 500% | 700% |  |  |
| A | 30 | 285 | 920 | 1,930 | 830 |
| B | 30 | 210 | 780 | 1,700 | 845 |
| A | 45 | 370 | 1,360 | 2,360 | 820 |
| B | 45 | 395 | 1,560 | 2,475 | 790 |
| A | 60 | 455 | 1,770 | 2,400 | 760 |
| B | 60 | 465 | 1,870 | 2,870 | 770 |
| A | 90 | 460 | 1,750 | 2,500 | 790 |
| B | 90 | 595 | 2,340 | 3,265 | 775 |

The above data show that the new accelerator is stronger than mercaptobenzothiazole. It was further found that the product is strongly activated by basic auxiliary accelerators like diphenyl guanidine and may be used to advantage with basic activation. Plasticity data on samples of the above uncured stocks show the processing safety afforded by the accelerators of this invention. The plasticity figures were determined by means of a Williams Plastometer described by Williams, Industrial and Engineering Chemistry, vol. 16, p. 362 (1924); see also Krall ibid, vol. 16, p. 922 (1924). The plasticity figure is in reality the height of a rubber test cylinder in 1/100 millimeters after the upper movable plate of the plastometer press has rested on it for a period of three minutes. Lower figures indicate a less curing of the stock. The results are set forth below:

Plasticity data

| Preheating Time in Mins. | Temp., °F. | Stock | Plasticity Figure |
|---|---|---|---|
| 60 | 200 | A | 310 |
| 60 | 200 | B |  |
| 120 | 200 | A | 561 |
| 120 | 200 | B |  |
| 180 | 200 | B | 488 |

As further illustrative of the invention but again without limiting the invention, a stock was compounded comprising Stock C, parts by weight
Butadiene-1,3-styrene copolymer _____ 100
Carbon black _____ 40
Zinc oxide _____ 3
Saturated hydrocarbon softener _____ 8
Sulfur _____ 2
Accelerator A _____ 1.2

The stock so compounded was vulcanized in the usual manner by heating in a press at 142° C.

TABLE II

| Stock | Cure Time in Mins. | Modulus of Elasticity in lbs./in.² at Elongation of 300% | Tensile at Break in lbs./in.² | Ultimate Elongation, Per Cent |
|---|---|---|---|---|
| C | 60 | 378 | 2,040 | 770 |
| C | 90 | 470 | 2,227 | 730 |

The above data show that the new accelerators are highly effective for accelerating vulcanization of sulfur vulcanizable conjugated butadiene polymers.

The accelerators of this invention are effective in the vulcanization of any rubbery material which can be vulcanized with sulfur and the term "a rubber" as employed in the present specification and attached claims is intended to include such materials generally. Rubbery products are characterized by elasticity which is the property of a body which causes it to resist deformation and thereby recover its original size and shape after the deforming force is removed. Examples of a rubber are India rubber, reclaimed rubber, balata, gutta percha, butadiene-1,3 polymer, copolymers of butadiene-1,3 with styrene and copolymers of butadiene-1,3 with acrylonitrile.

The present invention is not limited to the specific examples hereinbefore set forth wherein the new accelerators are preferred. Othr ratios of the compounding ingredients than those mentioned in the examples as well as other well known fillers, pigments and the like may be employed in the production of various types of rubber compounds as will be apparent to those skilled in the art to which this invention pertains. This invention is limited solely by the claims attached hereto as part of the present specification.

What is claimed is:

1. The process of vulcanizing a rubber which comprises heating a rubber and sulfur in the presence of a condensation product of a 2-mercapto thiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing a 2-mercapto thiazole, formaldehyde and ammonia in the ratio of at least five mols of formaldehyde, approximately one mol of ammonia and three mols of a 2-mercapto thiazole and heating the mixture, water being formed as a by-product of the condensation.

2. The process of vulcanizing a rubber which comprises heating a rubber and sulfur in the presence of a condensation product of a 2-mercapto arylene thiazole, formaldehyde and ammonia which contains at least 5 but less than 7 mols of formaldehyde combined with 3 mols of said 2-mercapothiazole, sulfur and nitrogen atoms in the ratio of 3:2 and oxygen, said condensation product being obtained by admixing a 2-mercapto arylene thiazole, formaldehyde and ammonia in the ratio of at least five mols of formaldehyde, approximately one mol of ammonia and three mols of a 2-mercapto arylene thiazole and heating the mixture, water being formed as a by-product of the condensation.

3. The process of vulcanizing a rubber which comprises heating a rubber and sulfur in the presence of a condensation product of a 2-mercaptobenzothiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing a 2-mercaptobenzothiazole, formaldehyde and ammonia in the ratio of at least five mols of formaldehyde, approximately one mol of ammonia and three mols of a 2-mercaptobenzothiazole and heating the mixture at 90–95° C., water being formed as a by-product of the condensation.

4. The process of vulcanizing a rubber which comprises heating a rubber and sulfur in the presence of a condensation product of 2-mercaptobenzothiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing 2-mercaptobenzothiazole, formaldehyde and ammonia in the ratio of at least five mols of formaldehyde, approximately one mol of ammonia and three mols of 2-mercaptobenzothiazole and heating the mixture, water being formed as a by-product of the condensation.

5. The process of vulcanizing India rubber which comprises heating India rubber and sulfur in the presence of a condensation product of a 2-mercapto thiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing a 2-mercaptothiazole, formaldehyde and ammonia in the ratio of at least five mols of formaldehyde, approximately one mol of ammonia and three mols of a 2-mercaptothiazole and heating the mixture, water being formed as a by-product of the condensation.

6. The process of vulcanizing India rubber which comprises heating India rubber and sulfur in the presence of a condensation product of a 2-mercapto arylene thiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing a 2-mercapto arylenethiazole, formaldehyde and ammonia in the ratio of at least five mols of formaldehyde, approximately one mol of ammonia and three mols of a 2-mercapto arylene thiazole and heating the mixture, water being formed as a by-product of the condensation.

7. The process of vulcanizing India rubber which comprises heating India rubber and sulfur in the presence of a condensation product of a 2-mercaptobenzothiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing a 2-mercaptobenzothiazole, formaldehyde and ammonia in the ratio of at least five mols of formaldehyde, approximately one mol of ammonia and three mols of a 2-mercaptobenzothiazole and heating the mixture at 90–95° C., water being formed as a by-product of the condensation.

8. The process of vulcanizing India rubber which comprises heating India rubber and sulfur in the presence of a condensation product of 2-mercaptobenzothiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing 2-mercaptobenzothiazole, formaldehyde and ammonia in the ratio of at least five mols of formaldehyde, approximately one mol of ammonia and three mols of 2-mercaptobenzothiazole and heating the mixture, water being formed as a by-product of the condensation.

9. The vulcanized rubber product obtained by heating a rubber and sulfur in the presence of a condensation product of a 2-mercaptothiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing a 2-mercaptothiazole, formaldehyde and ammonia in the ratio of at least five mols of formaldehyde, approximately one mol of ammonia and three mols of a 2-mercaptothiazole and heating the mixture, water being formed as a by-product of the condensation.

10. The vulcanized rubber product obtained by heating a rubber and sulfur in the presence of a condensation product of a 2-mercapto arylene thiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing a 2-mercapto arylene thiazole, formaldehyde and ammonia in the ratio of at least five mols of formaldehyde, approximately one mol of ammonia and three mols of a 2-mercapto arylene thiazole and heating the mixture, water being formed as a by-product of the condensation.

11. The vulcanized rubber product obtained by heating a rubber and sulfur in the presence of a condensation product of a 2-mercaptobenzothiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing a 2-mercaptobenzothiazole, formaldehyde and ammonia in the ratio of at least five mols of formaldehyde, approximately one mol of ammonia and three mols of a 2-mercaptobenzothiazole and heating the mixture at 90–95° C., water being formed as a by-product of the condensation.

12. The vulcanized rubber product obtained by heating a rubber and sulfur in the presence of a condensation product of 2-mercaptobenzothiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing 2-mercaptobenzothiazole, formaldehyde and ammonia in the ratio of at least five mols of formaldehyde, approximately one mol of ammonia and three mols of 2-mercaptobenzothiazole and heating the mixture, water being formed as a by-product of the condensation.

13. The vulcanized rubber product obtained by heating India rubber and sulfur in the presence of a condensation product of a 2-mercaptothiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing a 2-mercaptothiazole, formaldehyde and ammonia in the ratio of at least five mols of formaldehyde, approximately one mol of ammonia and three mols of a 2-mercaptothiazole and heating the mixture, water being formed as a by-product of the condensation.

14. The vulcanized rubber product obtained by heating India rubber and sulfur in the presence of a condensation product of a 2-mercapto arylene thiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing a 2-mercapto arylene thiazole, formaldehyde and ammonia in the ratio of at least five mols of formaldehyde, approximately one mol of ammonia and three mols of a 2-mercapto arylene thiazole and heating the mixture, water being formed as a by-product of the condensation.

15. The vulcanized rubber product obtained by heating India rubber and sulfur in the presence of a condensation product of a 2-mercaptobenzothiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing a 2-mercaptobenzothiazole, formaldehyde and ammonia in the ratio of at least five mols of formaldehyde, approximately one mol of ammonia and three mols of a 2-mercaptobenzothiazole and heating the mixture at 90–95° C., water being formed as a by-product of the condensation.

16. The vulcanized rubber product obtained by heating India rubber and sulfur in the presence of a condensation product of 2-mercaptobenzothiazole, formaldehyde and ammonia which contains at least 5 but less than 7 mols of formaldehyde combined with 3 mols of said 2-mercaptothiazole, sulfur and nitrogen atoms in the ratio of 3:2 and oxygen, said condensation product being obtained by admixing 2-mercaptobenzothiazole, formaldehyde and ammonia in the ratio of at least five mols of formaldehyde approximately one mol of ammonia and three mols of 2-mercaptobenzothiazole and heating the mixture, water being formed as a by-product of the condensation.

MARION W. HARMAN.

REFERENCES CITED

The following references are of record in the file of this patent:

UNITED STATES PATENTS

| Number | Name | Date |
|---|---|---|
| 1,779,715 | Scott | Oct. 28, 1930 |
| 2,338,864 | Mathes | Jan. 11, 1944 |